United States Patent [19]

Förster et al.

[11] 4,362,695

[45] Dec. 7, 1982

[54] FISSION PRODUCT FILTER FOR HOT REACTOR COOLANT

[75] Inventors: Siegfried Förster, Alsdorf; Nicolaos Ionitakis, Jülich; Peter Quell, Aachen, all of Fed. Rep. of Germany

[73] Assignee: Kernforschungsanlage Jülich GmbH, Jülich, Fed. Rep. of Germany

[21] Appl. No.: 185,886

[22] Filed: Sep. 10, 1980

[30] Foreign Application Priority Data

Sep. 14, 1979 [DE] Fed. Rep. of Germany ....... 2937209

[51] Int. Cl.³ .............................................. G21C 17/00
[52] U.S. Cl. ................................................... 376/314
[58] Field of Search .................... 176/37; 55/278, 520, 55/391, DIG. 9, 391; 376/314

[56] References Cited

U.S. PATENT DOCUMENTS

| 3,018,841 | 1/1962 | Gerlich ................................ 55/278 |
| 3,217,471 | 11/1965 | Silverman ............................ 176/37 |
| 3,219,538 | 11/1965 | Glueckaut et al. .................. 176/37 |
| 3,441,145 | 4/1969 | Pearson ................................ 55/278 |
| 3,692,497 | 9/1972 | Keith et al. .......................... 55/278 |
| 3,848,067 | 11/1974 | Cooper ................................. 176/37 |
| 3,996,646 | 6/1976 | Noakes et al. ....................... 55/520 |
| 4,048,074 | 9/1977 | Bruenemann et al. ............... 55/520 |
| 4,088,533 | 5/1978 | McGuire .............................. 176/37 |

FOREIGN PATENT DOCUMENTS

| 2655296 | 6/1978 | Fed. Rep. of Germany ........ 55/391 |
| 2655310 | 6/1978 | Fed. Rep. of Germany ...... 376/314 |
| 2802067 | 7/1978 | Fed. Rep. of Germany ...... 376/314 |
| 822163 | 10/1959 | United Kingdom . |

OTHER PUBLICATIONS

P. Fortescue et al., HTGR–Underlying Principles, Nucleonics, (Jan., 1980), pp. 86–90.

Primary Examiner—Sal Cangialosi
Attorney, Agent, or Firm—Karl F. Ross

[57] ABSTRACT

A filter for the removal by the exchange effect of fission products from the coolant, generally helium, of a nuclear reactor comprises a gas-tight duct containing at least one coil of corrugated metal strip, the coil being formed from two strip layers whose corrugations are mutually crossing.

9 Claims, 5 Drawing Figures

FISSION PRODUCT FILTER FOR HOT REACTOR COOLANT

FIELD OF THE INVENTION

Our present invention relates to a filter for the removal of fission products on an atomic or nuclear level from hot reactor cooling gas and, more particularly, from helium used as a primary coolant in a gas-cooled high temperature nuclear reactor.

BACKGROUND OF THE INVENTION

In gas-cooled high temperature nuclear reactors, the primary coolant (particularly helium) after traversing the reactor core may contain fission fragments which tend to deposit in the portions of the coolant circulation path adjacent the outlet of the reactor, complicating maintenance and repair because of the high level of radioactivity resulting from such fission product deposits.

When the path also includes a helium turbine, for example, the problem of maintenance and repair is pronounced and indeed may be impossible if the turbine is permitted to be contaminated by such fission products which invariably enter the coolant gas stream.

It has thus been proposed (see German patent documents-open applications-DE-OS No. 26 55 296 and DE-OS No. 26 55 310) to provide in the coolant path a filter which operates by exchange principles to trap atomic and molecular particles of the fission products and thereby remove them from the coolant gas.

Such filters include metal walls which define flow passages for the coolant and upon which the fission products are collected.

As a consequence, any dust particles within the coolant gas do not become contaminated with the fission products and the residual radioactivity of the gas and its components, downstream of the filter, can be reduced or eliminated. These publications also deal with the mathematical, dimensional and optimization factors for such filters in addition to describing metal walls which are effective to collect the fission products.

While these filters theoretically appear to be capable of effective use in the manner described, they are not technologically practical because of high fabrication cost and poor geometric efficiency.

OBJECTS OF THE INVENTION

It is the principal object of the present invention, therefore, to provide a fission product filter, specifically adapted for use in high temperature gas-cooled nuclear reactors and specifically helium-cooled reactors having a relatively simple construction and high operating efficiency.

Yet another object of this invention is to provide a filter for the latter purpose which can be readily inserted into and removed from the coolant path.

SUMMARY OF THE INVENTION

These objects and others which will become apparent hereinafter are attained, in accordance with the present invention, in a filter which comprises a coil of corrugated strip and, more specifically, a coil strip whose corrugations run oblique to the general flow direction of the coolant gas so that the gas, in traversing the coil in an axial direction, passes through and cross the corrugations, the coil consisting of a sheet metal capable of taking up the fission products in atomic or molecular form by an exchange effect.

According to a feature of the invention, the coil is formed from two corrugated strips jointly wound about a mandrel or coil former from respective rows of the corrugated strip disposed opposite so that, although the corrugations of the two strips are identical, the opposite coiling of then results in adjoining turns in the final coil having corrugations which are inclined to the axis of this coil in opposite directions and hence which cross one another.

We have found that best results are obtained when the corrugations of each strip are sinusoidal in cross section and have crests and troughs which are linear extending on a bias to longitudinal edges of the strip so that the corrugations or their axes from angles $\alpha$ with the axis of the coil, The angle $\alpha$ can range from say 5° to 85° and thus is always an acute angle. The fact that the crests of adjoining turns cross one another ensures support for the successive turns and provides the necessary flow passages through the coil.

According to yet another feature of the invention, at least one such coil body is mounted in an outer gas-tight tube which is, in turn, positioned in the coolant duct and is connected at opposite axial ends with a coolant gas inlet and a coolant gas outlet by removable or detachable means permitting the coil body and/or the tube to be replaced readily.

In other words, the coil body surrounded by the outer gastight mounting tube can be removably connected in the hot gas duct of the nuclear reactor and provided with releasable gas inlet and outlet fittings.

We have also found it to be advantageous to provide a plurality of such coil bodies within the mounting tube in a stack.

To retain the coil body or a plurality of such bodies in the mounting tube, it is advantageous to provide at the upper and lower ends of the coil stack, respective star-shaped yokes which are connected to the coil former or mandrel at their centers or hubs and have outwardly extending angularly equispaced arms which can be tensioned, e.g. by tie rods, against the opposite ends of the mounting tube around the coil body or bodies. According to yet another feature of the invention, at least one of these yokes, preferably the upper yoke at the gas inlet side, is formed with an outer bead or flange which has bayonet formations engaging complementary formations in a ring anchored in the wall of the surrounding duct so that upon release of the bayonet coupling, the mounting tube, the coil bodies therein and the yokes can be readily withdrawn. The term "bayonet formations" as used herein can refer to either bayonet ribs or lugs or the grooves with which such ribs are lugs mate. Preferably the ring is formed with the grooves. Upon release of the bayonet coupling, therefore, the filter assembly can be removed downwards of the duct and replaced.

The inlet and outlet can be connected to the mounting tube by simple sliding fittings using piston ring seals or like gas-tight connections. The lower pipe, generally the outlet, can simply be removed from the duct for replacement of the filter.

According to another feature of the invention, the bayonet coupling may be actuated by remote control means, e.g. a drive assembly, to enable the filter to be removed and replaced by personnel at a location a safe distance away from the filter when the latter is highly contaminated.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
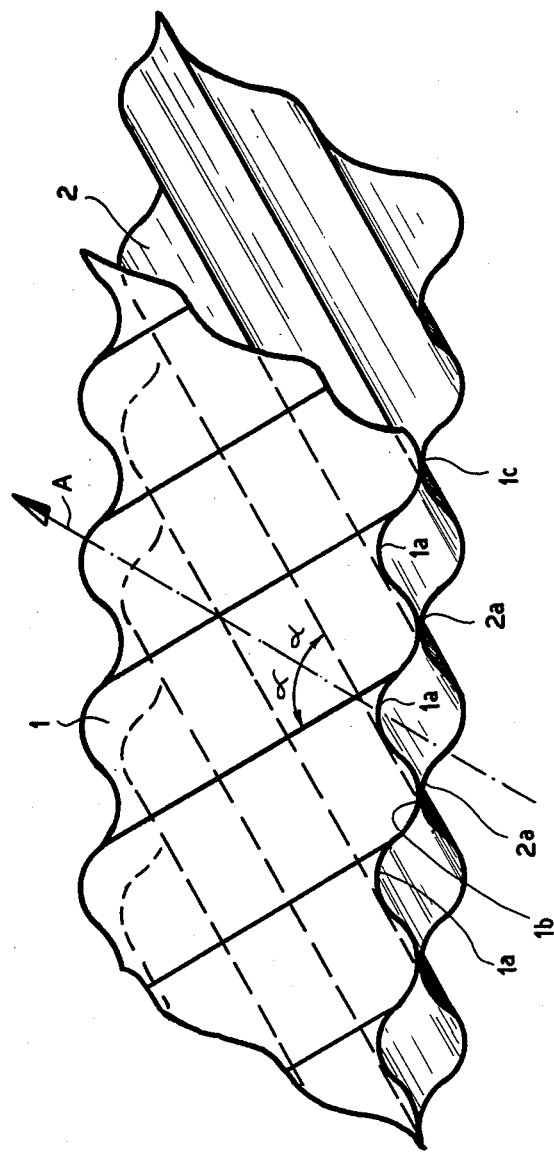
FIG. 1 is a perspective diagrammatic view showing two strips adapted to be coiled to form a filter according to the invention.
Figure 2:
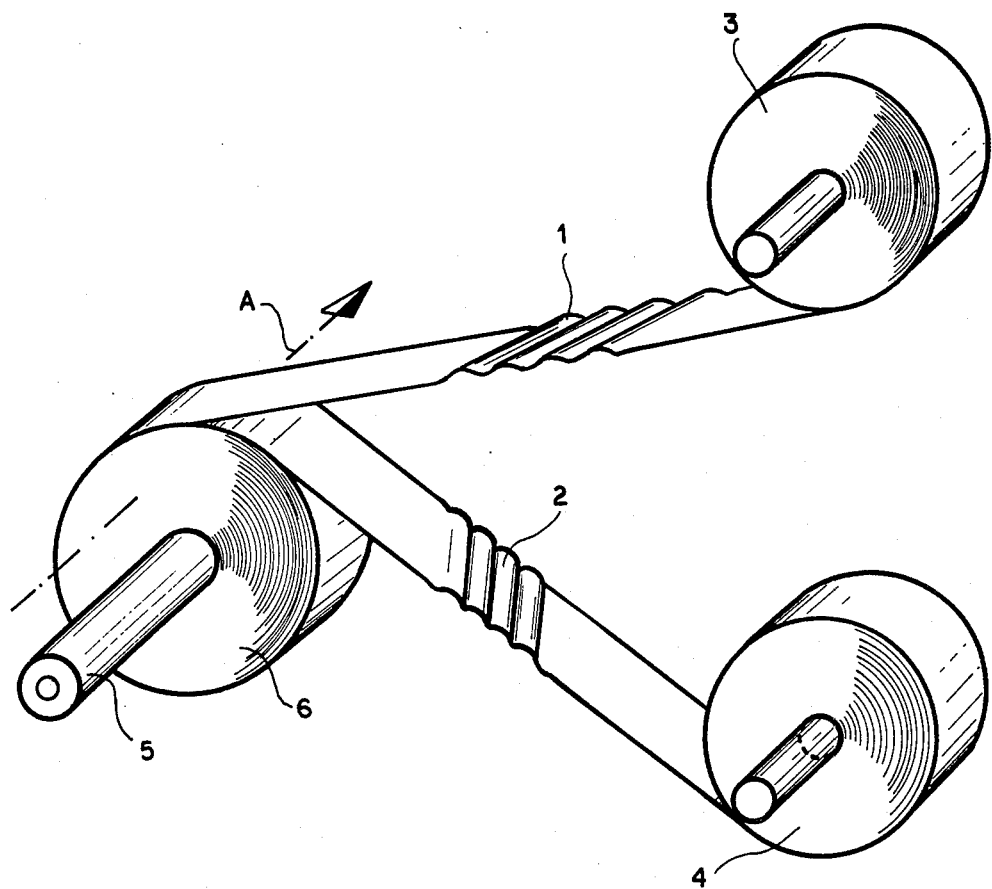
FIG. 2 is a diagram also in perspective view showing the coiling of the filter body.

As can be seen from FIGS. 1 and 2, the basic element of the filter of the present invention is a coil formed from two sheet metal strips 1, 2 which are corrugated with sinusoidal corrugations and which are identical but of reverse orientation so that the corrugations represented by the crests 1a of strip 1 cross the corrugations represented by the crests 2a of the strip 2. The troughs 1b bear upon the crests 2a at points represented at 1c, for example, so that the coil has structural integrity.

If the axial flow direction through the coil, represented by the arrow A, is shown in FIG. 1, it can be seen that the linear corrugations of the two strips include acute angles $\alpha$ with the axis.

The flow direction is also represented by arrow A in FIG. 2 which also shows how the coil body 6 is formed. Two rows of corrugated strip 3, 4 in mutually reversed relationship, feed the strips 1, 2 to the coiling station at which the strips are wound on a mandrel or coil former 5.

One or more such coil bodies 6 is mounted in a gas-tight tube 7 (see FIG. 3) disposed vertically in the coolant duct 100 of a nuclear reactor whose core is represented at 101 and which can be provided with duct work 102 of conventional design, carrying the hot helium coolant to the filter.

Upon removal of fission products, the duct 103 can carry the coolant to a turbine 104 from which it is recirculated to the nuclear reactor core.

Figure 3:
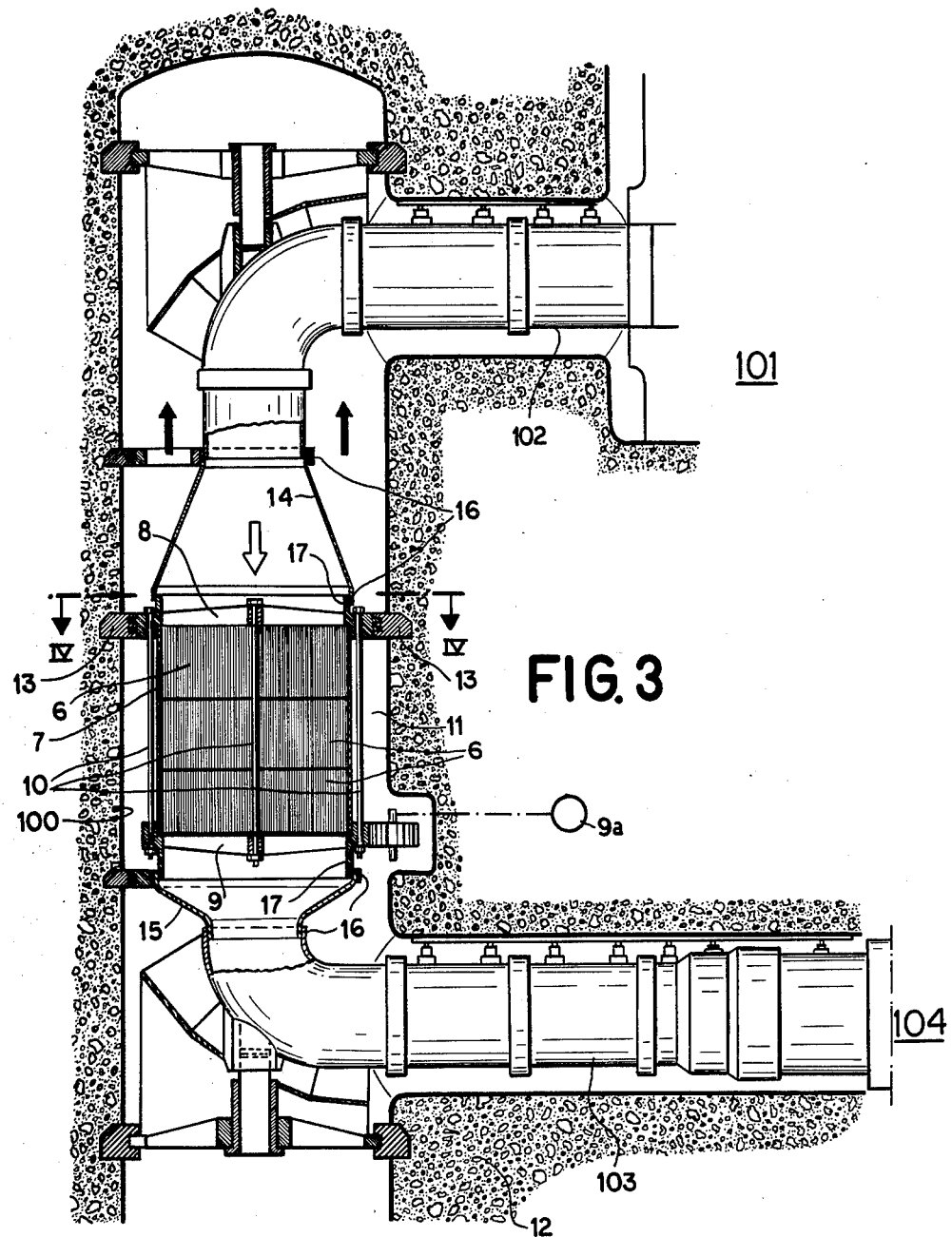
FIG. 3 is a vertical section through a filter in accordance with the principles of this invention.

In the embodiment shown in FIG. 3, the tube 7 contains three coil bodies 6.

Figure 4:
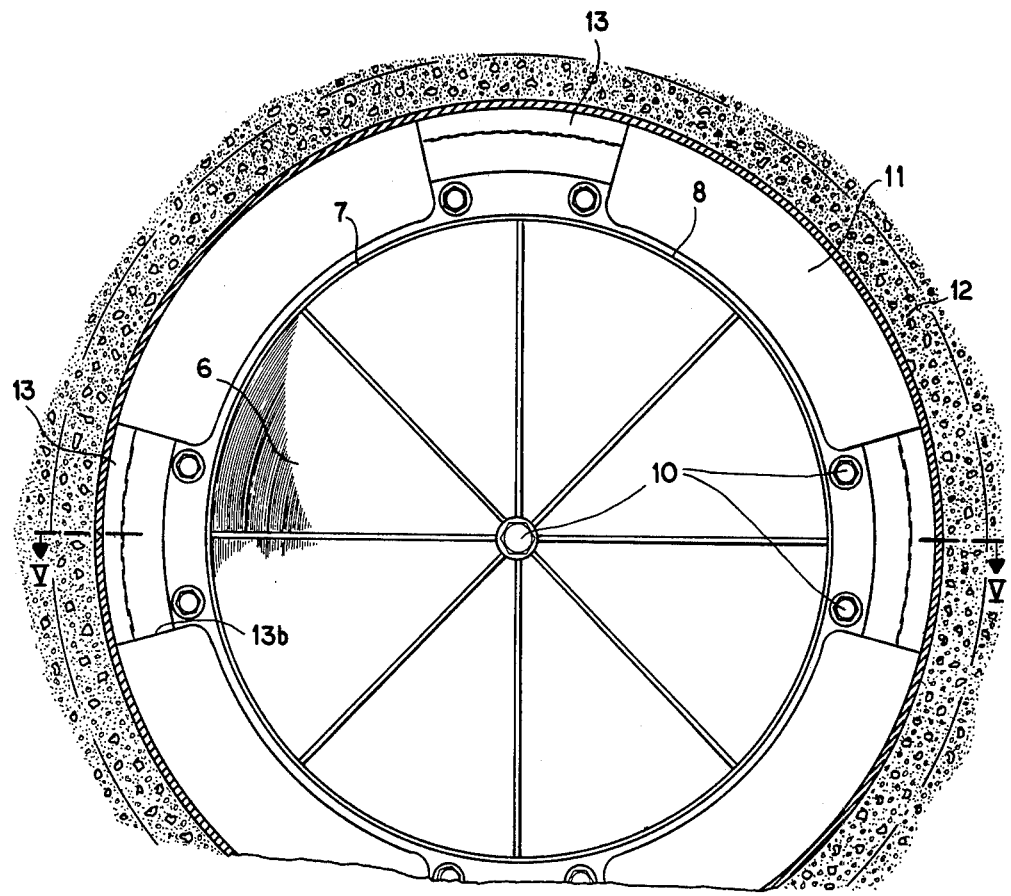
FIG. 4 is a cross-sectional view taken along the line IV—IV of FIG. 3.
Figure 5:
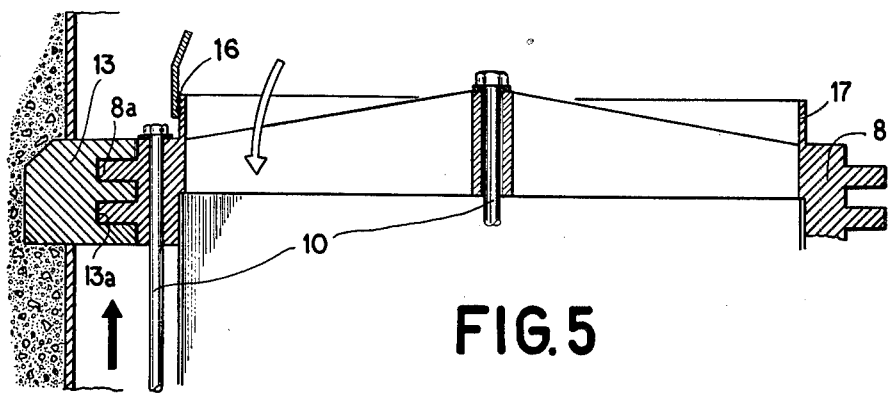
FIG. 5 is a section taken along the line V—V of FIG. 4.

In view of the scale of FIG. 3, the corrugations of the strips 1, 2 and the individual turns thereof cannot be seen in FIGS. 3 through 5.

The coil bodies are held in place between a pair of star-shaped yoke rings 8 and 9 which are centrally connected by a tie rod 10 which can run through the coil former 5 and by tie rods 10 connecting the outer peripheries of the yoke rings.

The duct 100 is formed with a vertical shaft 11, conventional in high temperature helium-cooled reactors, formed in the reactor containment 12 of reinforced concrete.

The upper yoke ring 8 forms a bayonet coupling (see FIGS. 4 and 5) with an outer fastening ring 13 anchored in the concrete vessel. To this end the upper yoke ring 8 can be formed with laterally projecting lugs 8a which fit into grooves 13a or ring 13 after passing through windows 13b so that a sliding rotation of the filter 6, 7, 8, 9 will lock the filter in place.

A gas inlet fitting 14 and a gas outlet fitting 15 communicate with the opposite ends of the tube 7, preferably via extensions 17 which may be formed on the rings 8 and 9. These extensions 17 be sealed against the fittings 14 and 15 by O-rings or like piston seals 16 (see FIG. 5) assuring a tight fit when the fittings are in place but enabling the fittings to be axially withdrawn and removed for replacement of the filter.

The lower ring 9 may have a toothed periphery for engagement by a gear wheel connected to a drive represent at 9a to allow the filter assembly to be rotated from a remote location and disconnected from ring 13 so that it can be lowered, e.g. by a cable or windlass assembly (not shown) for exchange of the filter and replaced without danger to operating personnel. The bottom fitting and duct are previously removed.

For example with a hot gas filter of the present invention in which the coil bodies have a diameter of 3 meters and an axial length (total) of 3.3 meters, one such filter being built into each of two hot gas ducts running from a high temperature helium-cooled reactor with a turbine-driven electrical generator with an output of 650 MWe, the maximum contamination of parts downstream of the filters over the life of the plant was 30 to 50 mrem/h. The radiation level was $10^3$ times higher without the filter.

The filter was also found to be satisfactory for other high temperature reactor systems, e.g. for process heat preparation and so-called two-cycle plants using a helium primary coolant and a steam turbine secondary cycle.

We claim:

1. In a fission product filter for a hot reactor coolant gas, especially helium, comprising a gas-tight chamber traversed by said gas during circulation thereof along a path and containing a filter element composed of a material capable of retaining fission products from said gas by material-exchange interaction of said gas with said filter element, said filter element being formed with passages traversed by said gas, the improvement wherein said filter element comprises at least one coil body composed of two corrugated metal strips having crests in direct contact with one another and coiled together upon a core, the corrugations of the two strips mutually crossing where said strips contact one another in adjacent turns so that a zig-zag pattern of flow is established for said gas through said coil body and the passages are formed around the mutually contacting crests of adjacent turns.

2. The filter defined in claim 1 wherein said corrugations are sinusoidal in cross section and extend at a bias to longitudinal edges of the strip, the corrugations forming acute angles with an axial direction of flow of gas through the coil body.

3. The filter defined in claim 2, further comprising a gas-tight tube receiving said coil body; means for removably mounting said coil body in said tube; and means for removably mounting said tube in said path.

4. The filter defined in claim 3 wherein said means for mounting said body in said tube includes a pair of yoke rings disposed on opposite axial sides of said coil body and tie rods connecting said rings and securing same against opposite ends of said tube.

5. The filter defined in claim 4 wherein the means for mounting said tube in said path includes a duct enclosing said path, a ring secured in said duct and a bayonet connection between the ring secured in said duct and one of said yoke rings.

6. The filter defined in claim 5 wherein said filter is disposed vertically and said bayonet connection is provided at the upper end of said tube.

7. The filter defined in claim 5, further comprising means actuatable at a location remote from said path effecting release of said bayonet connection to enable said filter to be withdrawn from said path.

8. The filter defined in claim 3, further comprising releasable inlet and outlet fittings connected to opposite ends of said tube.

9. The filter defined in claim 8, further comprising seals between said fittings and the respective ends of said tube

* * * * *